US006944465B2

(12) United States Patent
Spain et al.

(10) Patent No.: US 6,944,465 B2
(45) Date of Patent: Sep. 13, 2005

(54) ESTIMATING THE LOCATION OF A MOBILE UNIT BASED ON THE ELIMINATION OF IMPROBABLE LOCATIONS

(75) Inventors: David Stevenson Spain, Portola Valley, CA (US); Robert Lewis Martin, Antioch, CA (US); Luis Perez-Breva, Barcelona (ES)

(73) Assignee: Polaris Wireless, Inc., Santa Clara, CA (US)

( * ) Notice: Subject to any disclaimer, the term of this patent is extended or adjusted under 35 U.S.C. 154(b) by 279 days.

(21) Appl. No.: 10/299,398

(22) Filed: Nov. 18, 2002

(65) Prior Publication Data

US 2003/0064735 A1 Apr. 3, 2003

Related U.S. Application Data

(63) Continuation-in-part of application No. 10/128,128, filed on Apr. 22, 2002, now Pat. No. 6,782,265, and a continuation-in-part of application No. 09/532,418, filed on Mar. 22, 2000, now Pat. No. 6,393,294, and a continuation-in-part of application No. 09/158,296, filed on Sep. 22, 1998, now Pat. No. 6,269,246.

(51) Int. Cl.[7] .......................... H04Q 7/20; H04M 11/04
(52) U.S. Cl. ............................... 455/456.1; 455/404.2; 455/456.6; 455/229; 455/421; 340/989; 340/991
(58) Field of Search .......................... 455/456.1–456.6, 455/229, 421; 340/984, 941; 342/357.01–357.12, 404.2, 456.3, 422.1

(56) References Cited

U.S. PATENT DOCUMENTS 4,792,796 A * 12/1988 Bradshaw et al. ..... 340/539.21

| 6,091,716 | A | * | 7/2000 | Gorday et al. ............... 370/314 |
| 6,108,553 | A | * | 8/2000 | Silventoinen et al. ..... 455/456.3 |
| 6,243,568 | B1 | * | 6/2001 | Detlef et al. ............. 455/226.4 |
| 6,308,072 | B1 | * | 10/2001 | Labedz et al. ............... 455/448 |
| 6,327,471 | B1 | * | 12/2001 | Song ........................... 455/440 |
| 6,556,822 | B1 | * | 4/2003 | Matsumoto ................. 455/421 |

FOREIGN PATENT DOCUMENTS

JP         02044929         2/1990

OTHER PUBLICATIONS

Gaspard, Ingo et al., "Position Assignment in Digital Cellular Mobile Radio Networks (e.g., GSM) Derived From Measurements at the Protocol Interface," IEEE (0–7803–3659–3/79) (1997), pp. 592–596).
Hellebrandt, Martin et al., "Estimating Position and Velocity of Mobiles in a Cellular Network," IEEE Trans. on Vehicular Technology, 46(1) Feb. 1997, pp. 65–71.
Jimenez, J. et al., "Mobile Location Using Coverage Information: Theoretical Analysis and Results," European Cooperation in the Field of Scientific and Technical Research (Euro–Cost) 043 (Apr. 1999) pp. 1–9.
Koshima, Hiroaki et al., "Personal Locator Services Emerge," IEEE Spectrum Feb. 2000, pp. 41–48.

* cited by examiner

Primary Examiner—Sonny Trinh
Assistant Examiner—Huy Phan
(74) Attorney, Agent, or Firm—DeMont & Breyer, LLC

(57) ABSTRACT

A method for determining the location of a mobile unit (mobile unit) in a wireless communication system is disclosed. The illustrative embodiment provides a computationally-efficient technique for reducing the number of possible positions that have to be analyzed. In particular, the illustrative embodiment eliminates possible positions for the mobile unit from consideration by considering which signals the mobile unit can—and cannot—receive and the knowledge of where those signals can and cannot be received.

15 Claims, 19 Drawing Sheets

| Fingerprint Structure | | | | | |
|---|---|---|---|---|---|
| Time of Capture: | | | | | |
| Station ID: | I1 | I2 | I3 | ... | In |
| Frequency: | F1 | F2 | F3 | ... | Fn |
| Tuning Parameters: | P1 | P2 | P3 | ... | Pn |
| Transmitter Location: | L1 | L2 | L3 | ... | Ln |
| Signal Strength 1: | S11 | S12 | S13 | ... | S1n |
| Signal Strength 2: | S21 | S22 | S23 | ... | S2n |
| ... | ... | ... | ... | ... | ... |
| Signal Strength m: | Sm1 | Sm2 | Sm3 | ... | Smn |

| No. | Lat. | Long. | Time | Fingerprint | Description |
|---|---|---|---|---|---|
| 1 | | | | | |
| 2 | | | | | |
| 3 | | | | | |
| 4 | | | | | |
| 5 | | | | | |
| 6 | | | | | |
| ... | | | | | |
| L | | | | | |

Fingerprint Database

501

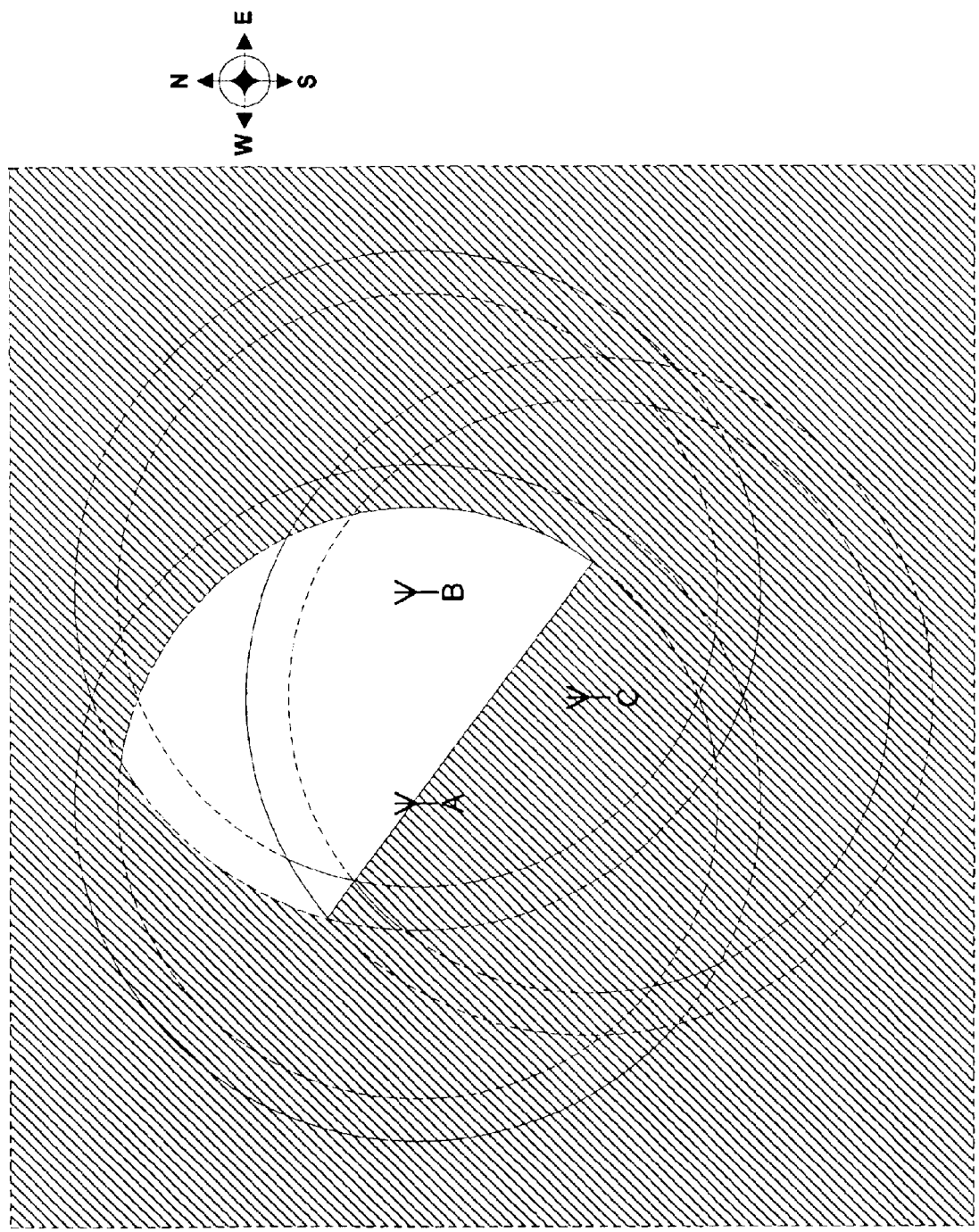
FIG. 18
Eliminated With Test #1, #2, or #3 

ESTIMATING THE LOCATION OF A MOBILE UNIT BASED ON THE ELIMINATION OF IMPROBABLE LOCATIONS

CROSS-REFERENCE TO RELATED APPLICATION

This application is a continuation-in-part of U.S. patent application Ser. No. 09/158,296, filed Sep. 22, 1998, now U.S. Pat. No. 6,269,246 U.S. patent application Ser. No. 09/532,418, filed Mar. 22, 2000, now U.S. Pat. No. 6,343,294 and U.S. patent application Ser. No. 10/128,128, filed 22 Apr. 2002, now U.S. Pat. No. 6,782,265, all of which are incorporated by reference.

BACKGROUND OF THE INVENTION

The present invention relates generally to telecommunications, and more specifically to wireless communication systems.

In connection with mobile communication systems, it is becoming increasingly important to determine the location of the communicating Mobile Unit. Various systems for locating are already well known. One solution that is readily available in most modern cellular systems is to use the ID of the cell from which the mobile unit is communicating. Typically, this information is accurate to a resolution of several miles. A second solution is to compute the location of the mobile unit based on the cellular network signaling parameters (angle of arrival or time difference of arrival). This information is typically accurate to hundreds of meters. Yet another solution is to equip the mobile unit with a GPS receiver which then attempts to track the location of the mobile unit as accurately as possible. Typically, GPS receivers can compute locations to within several tens of meters of accuracy. When combined with differential corrections, the GPS accuracy can be improved.

As far as reliability is concerned, the cell ID information is the most reliable, and is guaranteed to be available as long as the cellular network is functioning normally. The network signal based location computations are less reliable, since they are dependent on several conditions being true at the time of the call. For example, most schemes require the mobile unit to have line-of-sight visibility to multiple cellular base stations. This is not always possible. GPS based location computation is also not always reliable since the mobile unit may be in an environment where there is no penetration of the GPS satellite signals.

SUMMARY OF THE INVENTION

The present invention provides a method for determining the location of a mobile unit without some of the costs and disadvantages associated with techniques in the prior art. In the prior art, a very large number of possible positions might have to be analyzed to determine if the mobile unit is there and this can be computationally cumbersome. Therefore, any computationally-efficient technique that reduces the number of possible positions that have to be analyzed is advantageous. The illustrative embodiment provides a computationally-efficient technique for reducing the number of possible positions that have to be analyzed. In particular, the illustrative embodiment uses three logical tests to reduce the number of possible locations whose fingerprints must be considered. The three tests are:

Test #1—Eliminate all locations outside the serving area of the cell that is reported as the serving cell.

Test #2—Eliminate all locations outside the neighbor area of each of the cells that is reported as a neighbor cell.

Test #3—Eliminate all locations at which an unreported neighbor is known to be significantly stronger than a reported neighbor.

Some embodiments of the present invention also improve location accuracy by eliminating potentially ambiguous positions from consideration.

The illustrative embodiment comprises: a method for estimating the location of a mobile unit from a plurality of possible positions, the method comprising: receiving an indication from the mobile unit that the mobile unit does not receive a first signal from a first transmitter; eliminating some of the plurality of possible positions from consideration based on the fact that the mobile unit did not receive the first signal from the first transmitter; and choosing as an estimate of the position of the mobile unit one of the plurality of possible positions not eliminated from consideration based on the fact that the mobile unit did not receive the first signal from the first transmitter.

BRIEF DESCRIPTION OF THE DRAWINGS

FIG. 9 is an illustration of the organization of the fingerprint data; and

FIG. 10 is an illustration of the organization of the fingerprint database.

FIG. 18 depicts a map of all of the locations that can be eliminated in accordance with FIGS. 15, 16, and 17.

DESCRIPTION OF SPECIFIC EMBODIMENTS

The present invention provides a new method for determining the location estimate of a Mobile Unit (mobile unit) in a wireless communication network.

Figure 1:
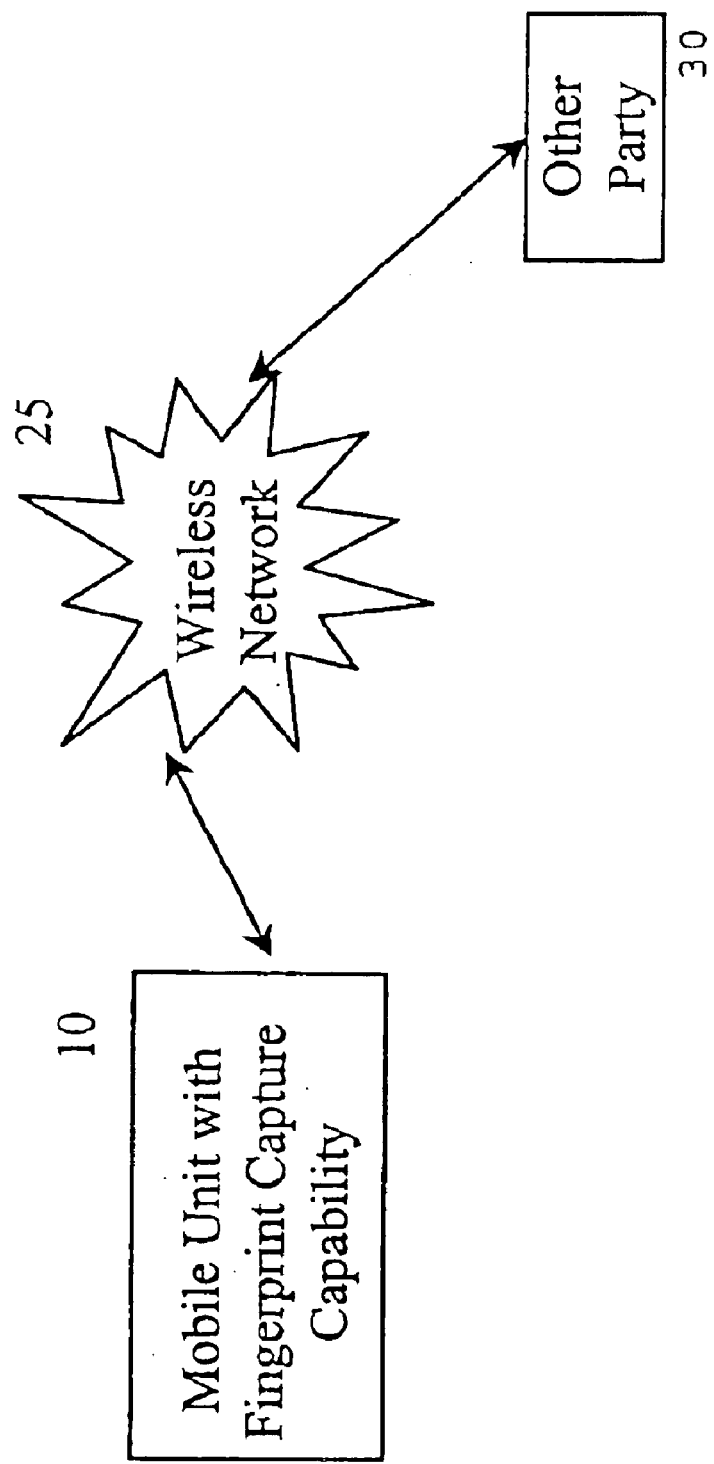
FIG. 1 shows a representative wireless communication system.

FIG. 1 is a high level block diagram of a wireless communication network. A Mobile Unit 10 has a connection with a wireless network 15, which in turn is connected to location server 30. The location server may or may not be mobile. The location of the mobile unit is of interest to the location server for several reasons such as provisioning of prompt and efficient personalized services, dispatching emergency assistance personnel, tracking the movements of the mobile unit, etc.

There are several different prior art methods for determining the location of mobile unit 10, as is known to one skilled in the art. For example, the mobile unit could be equipped with a GPS receiver. Alternatively, the wireless network could be equipped to determine the location of mobile unit 10. For example, the network could monitor the time of arrival of signals from the mobile unit at various nodes and from that information determine its location. Again, such techniques are well known to one skilled in the art.

All of the prior art techniques have significant disadvantages. For example, it is well known that GPS receivers do not work very well in urban canyons and indoor locations where signal strength is very low. The network based schemes such as TDOA and AOA (both well known prior art) are disadvantaged in that they need significant infrastructure modifications.

The present invention provides a new method for determining the location of mobile unit 10 which (a) works in areas where GPS coverage is not typically available, and (b) does not require any infrastructure modifications. Thus, the present invention complements existing location determining technologies and, when used in conjunction with them, augments their performance.

The invention is based on the principle that any location has a unique Radio Frequency (RF) spectral fingerprint. Spectral fingerprint in this context is defined as a predetermined combination of observable RF spectral parameters. For instance, observed signal strength of a predetermined set of signals in the RF spectrum constitutes a fingerprint. Today, worldwide, practically the entire RF spectrum, up to 2 GHz and above, is being utilized by several different applications. The signal characteristics vary greatly across this spectrum. However, for any given location, it is possible to pre-select a portion of the spectrum and a combination of signal parameters in the pre-selected band that will be unique to that location.

In accordance with the invention mobile unit 10 is equipped with circuitry and software that is capable of capturing information from predetermined portions of the RF spectrum. In one embodiment the predetermined portions of the RF spectrum all fall within or in close proximity to the same band as that utilized by the wireless communication network. In such an instance the same hardware circuitry can be used for performing both functions. In another embodiment the predetermined portions of the RF spectrum are different from the wireless communication band and in such an instance additional circuitry is required. For example, the mobile unit may use signal characteristics from the television UHF band, in which case it will require a television tuner capable of capturing the appropriate television channels. In another example the mobile unit is equipped with a tuner designed to capture AM or FM radio broadcasts. In this case the mobile unit is equipped with a radio capable of tuning to the appropriate radio broadcasting bands.

Figure 2:
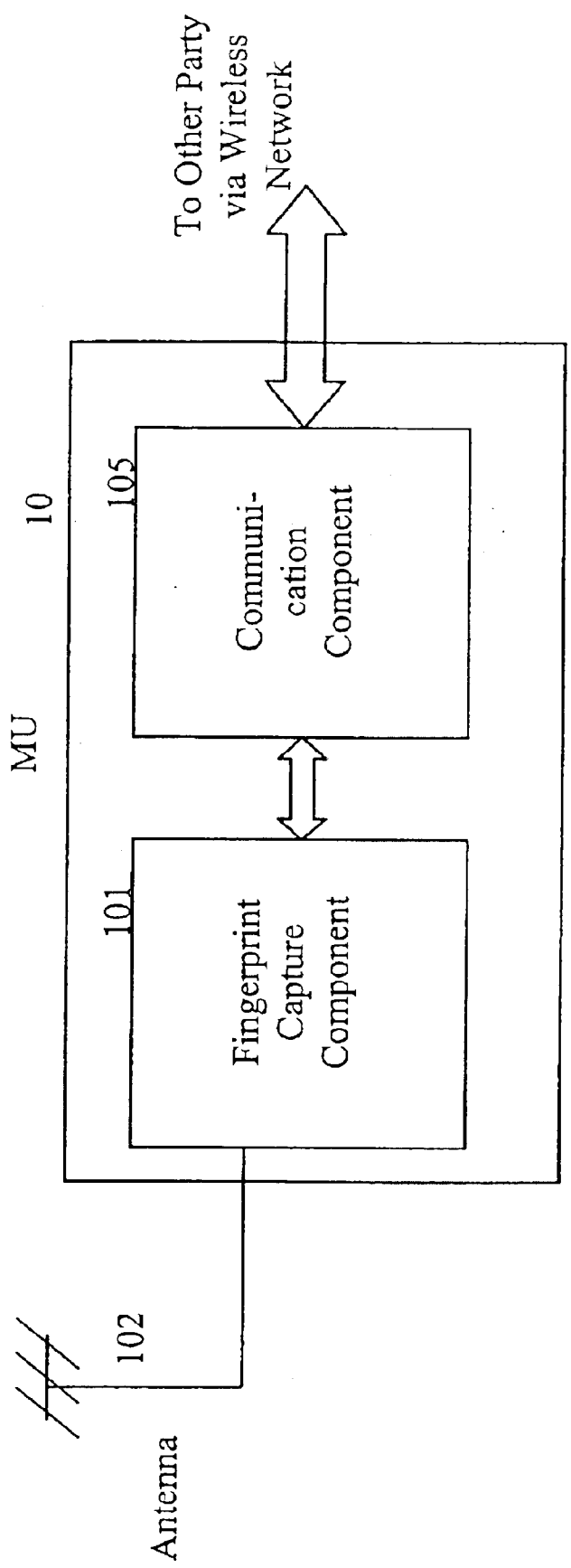
FIG. 2 is a high level diagram of the Mobile Unit.

FIG. 2 shows the mobile unit containing a component 101 for tuning to a predetermined portion of the RF spectrum. Also included is a communication component 105 for communicating information with the location server over an existing wireless infrastructure. Component 101 obtains information from the RF spectrum via an Antenna 102. In one embodiment of the system, the communication link between the mobile unit and location server is through the base stations and base station controllers of the cellular network. In another embodiment of the system, data is communicated in both directions between the mobile unit and location server by using the Short Messaging System (SMS) of the network. Using SMS messages for implementation of this invention has the advantage of avoiding potential interference with voice channel network operations.

In many instances, location server 30 is interested in only determining if mobile unit 10 is at a particular location or not. The resolution of knowing the mobile unit's location is not high (e.g., several meters), but much coarser, such as of the order of several tens of meters. For example, location server 30 may be interested in knowing if mobile unit 10 is inside a particular building, or a campus or a block. In such cases it is not necessary to provide very high-resolution information to location server 30.

There are other instances where location server 30 is desirous of knowing the accurate location of mobile unit 10, however, is incapable of doing so. This could be because other location determining capabilities in the system, such as GPS, are not functional at the instant when the location information is desired. This is typical when the mobile unit is in an area where GPS signals are not available, such as inside a building. The location determining method described in this invention is capable of operating in areas where GPS and other location technologies are not.

When a location estimate of the mobile unit is desired (either by the mobile unit itself or by the location server), it activates component 101 (FIG. 2), which captures predetermined information from a predetermined portion of the RF spectrum. Instructions regarding what information to capture and the portion of the RF spectrum from which to capture may be either pre-programmed in the mobile unit, or generated in real time. In the latter case, it may be generated in the mobile unit, or downloaded into the mobile unit from the location server over the wireless network. The mobile unit may capture multiple pieces of information or from multiple portions of the spectrum.

The spectral fingerprint may be generated using many different parameters, either individually or in combination. In one embodiment, signal strength is used. In another embodiment, phase information is used. In another embodiment, the identity of the received signals (e.g., frequency) is used. In yet another embodiment, the identity of the signal source (e.g., channel number or station code) is used. In yet another embodiment, the geographic locations of the transmitters from which the signals originate are used.

A mobile cellular channel is in general frequency selective, i.e., its properties vary over the bandwidth used. The variation depends on the environment, because of multipath signals arriving at different delays. For a GSM signal with a bandwidth about 250 kHz, the dispersion can be felt in urban and hilly environments. It causes inter-symbol-interference, which results in digital errors unless corrected. The time dispersion is often expressed as the delay spread or the standard deviation of the impulse response. The remedy in a receiver is to have an equalizer, typically a transversal filter with some taps that can be adjusted. This filter will remove the inter-symbol-interference. The filter's tap values depend on the environment and impulse response, and thus in principle add additional information to the RF fingerprint. For future systems which use W-CDMA (wideband code division multiple access), the bandwidth is more than 10 times higher, of the order 4–5 MHz. The resolution power is thus much higher, and the various filter taps contain much more information. In this embodiment of the invention, the spectral characteristics within the used bandwidth (and not just individual center frequencies), as measured by the equalizer filter, will be included in the RF fingerprint.

The mobile unit is equipped with the appropriate circuitry and software to capture the required signals and their parameters. In one embodiment the mobile unit has an antenna that is designed to have a bandwidth spanning a large portion of the VHF and UHF spectrum, e.g., from 70 MHz to 1 GHz. In another embodiment, the mobile unit has an antenna that is designed to capture only a narrowband of the spectrum. Such an antenna may be cheaper to implement and unobtrusive. In one embodiment the mobile unit is equipped with appropriate circuitry to determine the strength of the received signal. In one instance the location of the transmitter is broadcast in the signal and is extracted in the mobile unit.

In one embodiment, the mobile unit is instructed by the location server to scan selected portions of the spectrum and capture selected parameters from the received signals. The location server determines which portions of the spectrum to scan and what parameters to capture based on other information it has received or generated regarding the mobile unit. For example, in one instance the location server knows the approximate location of the mobile unit by receiving identity of the (wireless communication network) cell that the mobile unit is in at that time. By looking up a database the location server can determine the geographic location of the cell. The location server then determines which signals in the vicinity of the cell are most suitable for generating a fingerprint. For example, certain television signals may have better coverage of the cell than other signals. The cellular network then transmits this information (e.g., television channel numbers) to the mobile unit via the wireless link requesting it to scan only those selected signals.

In another embodiment, the mobile unit determines which portion of the spectrum to scan, and what parameters to use for generating the fingerprint.

After the mobile unit captures the appropriate signals and extracts the parameters, it has the basic information for generating the fingerprint. Some preprocessing may be required to refine the raw data. For example, signal strengths may have to be lower and upper limited to eliminate very weak and very strong signals.

Once the fingerprint is generated, its association with a certain location has to be determined. According to this invention this is done by utilizing a fingerprint database that contains a number of fingerprints along with their corresponding location identities. In one embodiment the database is stored in the mobile unit. The generated fingerprint is compared with the fingerprints in the database and the fingerprint in the database that is closest to the generated fingerprint is selected as the match. The corresponding location in the database is then chosen as the location of the mobile unit. In one embodiment, the search algorithm takes more than one fingerprint from the database that are closest to the generated fingerprint and interpolates the most plausible location for the mobile unit from the locations of the chosen fingerprints.

In another embodiment, the fingerprint database is stored at the location server and the generated fingerprint (in the mobile unit) is transmitted to the location server over the wireless link. The search for the closest fingerprint is then done in the location server from which it determines the location of the mobile unit.

Figure 3:
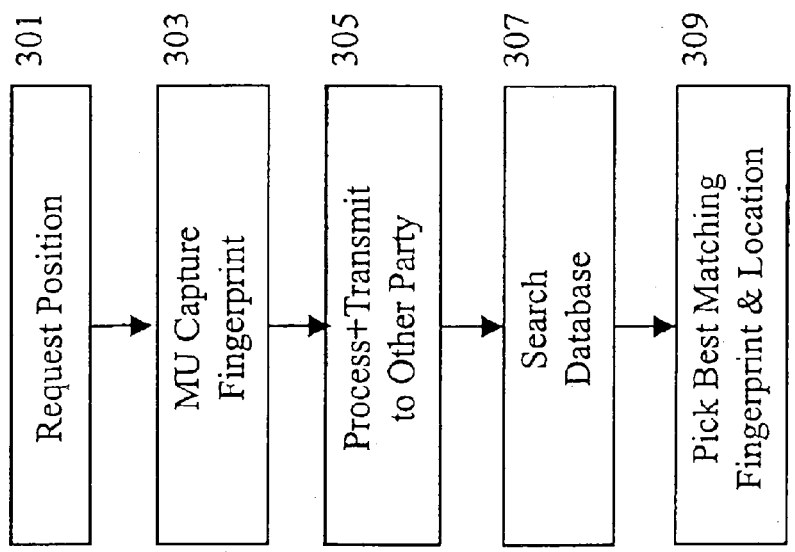
FIG. 3 is a flow diagram of the position determining process employed by this invention.

FIG. 3 depicts the flow of events in this case. A request for position of the mobile unit is generated, as shown in box 301. The request may be generated by the user carrying the mobile unit, or remotely by the location server. On receipt of the request the mobile unit captures the fingerprint of its current location (box 303). The captured fingerprint is processed appropriately. Processing may include filtering the fingerprint data and reformatting it to reduce its storage space. Subsequently the fingerprint is transmitted over the wireless link to the location server as shown in box 305. The location server has a database into which it executes a search for the closest matching fingerprint, as shown in box 307. Box 309 shows the process culminating in the retrieval of the best matching fingerprint along with its corresponding location. In one embodiment the search also returns a confidence measure that depicts the closeness of the match.

According to one implementation, the fingerprint database is designed to compensate for any co-channel and adjacent-channel interference measured by the mobile unit (mobile unit). This channel interference can result from either control channels or traffic channels. To improve the accuracy, as well as viability, of any algorithm for mobile unit location based on measurements of base station signal strengths, corrections for channel interference will be required. These interference corrections are calculated and updated off-line using RF prediction models (the same models employed to generate the original fingerprint database) and the wireless carrier's frequency/channel allocation plan (FCAP). In one embodiment of the invention, the interference corrections are implemented in the fingerprint database, which is stored in the location server.

Figure 4:
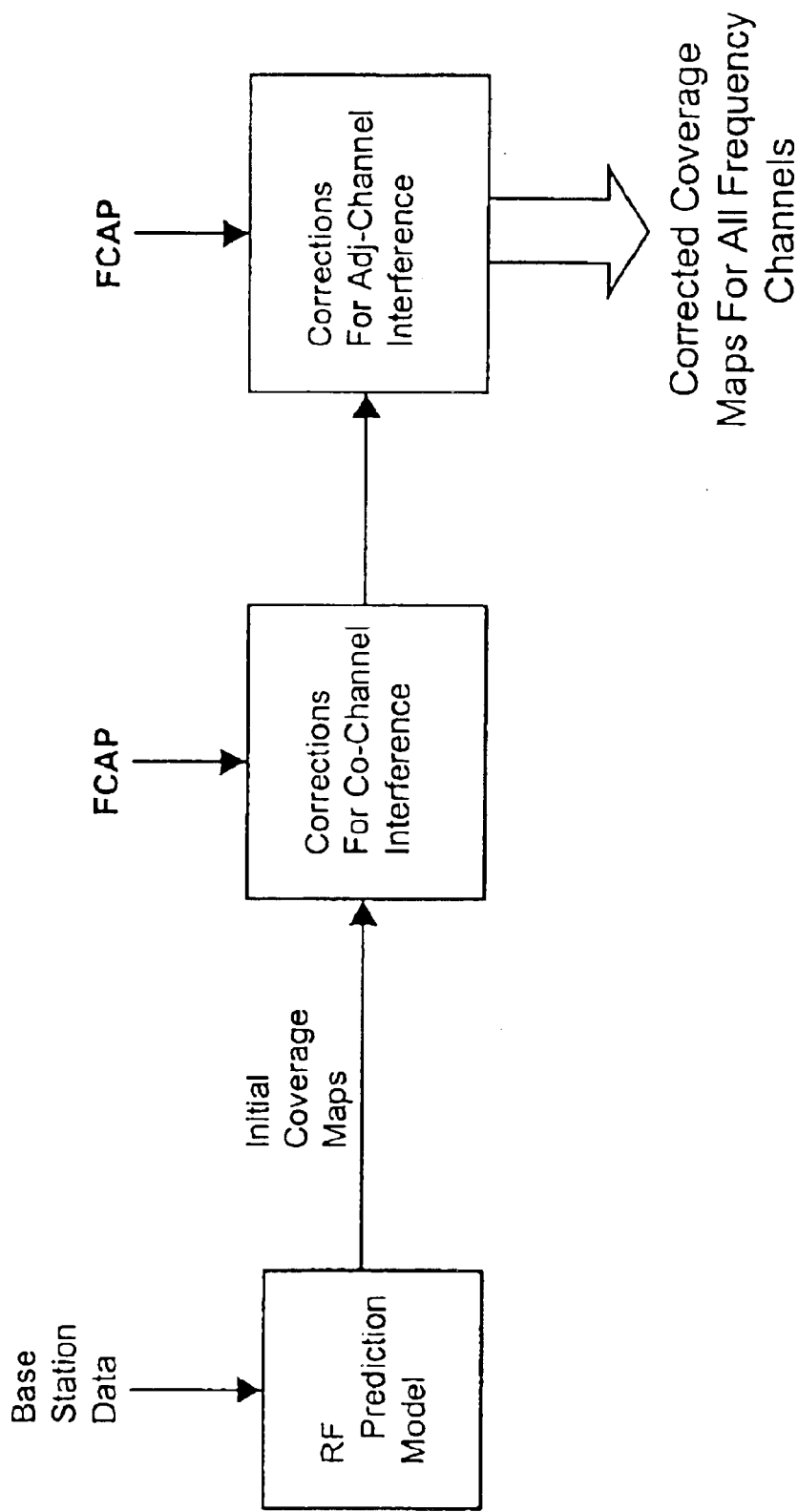
FIG. 4 is a block diagram showing the technique for implementing corrections for co-channel and adjacent-channel interference.

FIG. 4 describes the data flow and processing requirements for this technique. The data required from the wireless carrier's FCAP is as follows: cell global identifiers, frequency identifiers for the assigned base station control channels, and frequency identifiers for the assigned traffic channels. Co-channel interference sources are identified using the FCAP to identify base stations that are assigned the same frequency channel; the corrected signal strengths in each channel are then calculated. Adjacent-channel interference sources are identified using the FCAP to identify base station pairs that are assigned adjacent frequency channels; the corrected signal strengths are then calculated by also using the mobile unit's filter discrimination ratio. The resulting interference-corrected fingerprints are stored in the fingerprint database.

Figure 5:
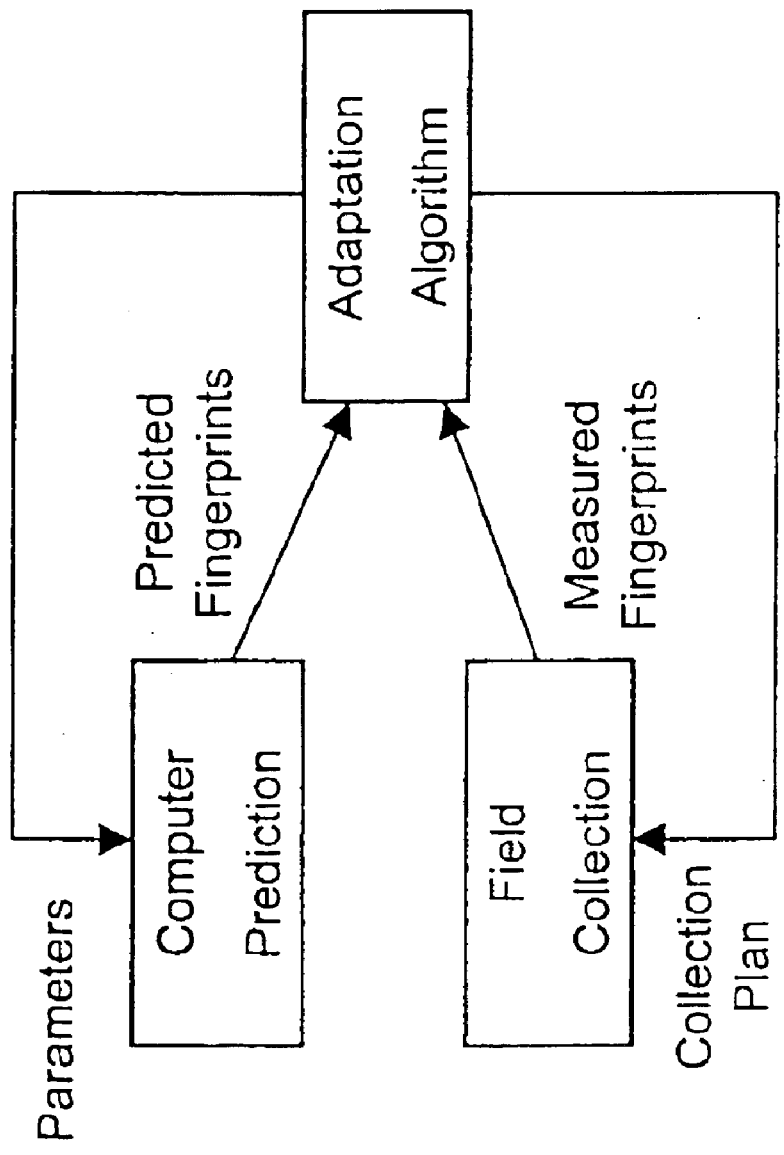
FIG. 5 is a block diagram describing the technique for calibrating the predicted fingerprint database using field measurements.

According to one implementation, the fingerprint database is generated by computer calculations with RF prediction models using certain parameters which depend on the type of buildings, terrain features, time of the day, environmental and seasonal conditions, etc. The calculations are based upon theoretical models which have general applicability, but cannot consider all of the details in the real world. The accuracy of the fingerprint database can be enhanced by comparing the model predictions with field measurements as shown in FIG. 5. The adaptation algorithm analyzes the nature of the difference between the predicted and measured fingerprints and determines the best way of changing the model parameters to reduce the difference. Since the database consists of multiple frequencies, the difference is a multi-dimensional vector. The minimization of the difference can use a combination of advanced computational techniques based upon optimization, statistics, computational intelligence, learning, etc.

The adaptation algorithm also determines what measurements to collect to best calibrate the RF prediction model. Instead of collecting all measurements, only measurements that can provide the maximal information to support reduction of the prediction errors are collected. The specific choice of measurements to collect is based upon an analysis of the nature of the error and the desired accuracy of the prediction model. The algorithm determines not just the locations for measurement collection, but also the time of collection, and the number of measurement samples needed to achieve a certain degree of accuracy based upon statistical considerations.

To improve the accuracy of the fingerprint database, learning/training techniques and methodologies can be adopted for this problem. For this embodiment of the invention, either Support Vector Machines for Regression or Regularized Regression can be used to learn each mapping of position versus fingerprint (measured or predicted signal strengths). Position will be used as the input value, while signal strength will be used as the target value. The complete grid of locations for the cellular service area will be used as training data. The final result is a learned relationship between position and signal strength for each mapping so that, given an arbitrary position, the corresponding signal strength is obtained for each particular frequency channel.

The inputs of the training step are a set of positions matched with the corresponding signal strengths, and the fingerprint measurements whose information should be considered in the learning process are added to the training set. The machine is then re-trained and a new grid is generated for the database, to replace the old one. The following list summarizes the major advantages of learning/training techniques: (1) they offer a way to interpolate between grid points and reconstruct the grid, together with metrics to relate measurements and expected fingerprints; (2) a local improvement of the neighboring area results from adding one measurement to the training set, and not only the particular location is affected, therefore, there is no need to obtain measurements for the complete grid; (3) measurements taken at different times can help to produce specific databases for different times of the day, different weather conditions, or different seasons; and (4) the system can learn which are the ambiguous areas with an intelligent agent, and collect measurements for them, so the database can be continually improved.

According to one implementation, the fingerprint database is designed to take into account any dynamic, but predetermined, variations in the RF signal characteristics. For example, it is not uncommon that some AM radio broadcast stations lower their transmitter power at night to minimize interference with other stations. In some countries this is mandated by law. If signal strength is one of the parameters used for generating the fingerprint, then it is essential that the dynamic change in transmitted power be taken into consideration before any decision is made.

According to this aspect of the invention, the fingerprint database and the decision algorithms are designed to accommodate such dynamic changes. Since the change pattern in signal characteristics is predetermined, the database is constructed by capturing the fingerprints at different times so as to cover all the different patterns in the transmitted signals. The time at which a fingerprint was captured is also stored along with its location identity.

There are many choices for the search algorithm that is required to determine the closest matching fingerprint, as can be appreciated by one skilled in the art of statistical pattern matching. Specifically, the choice of the algorithm is a function of what parameters are used to generate the fingerprints. In one instance the search algorithm chooses the fingerprint from the database that has the smallest mathematical distance between itself and the captured fingerprint. The mathematical distance is defined as a norm between the two data sets. For example, it could be the average squared difference between the two fingerprints. There are many different ways to define "closeness" between two fingerprints; again, this is dependent on the signal parameters used to generate the fingerprints. In one embodiment the search algorithm also has built in heuristics that make the best possible decision in case none of the fingerprints in the database matches well with the generated fingerprint.

Mobile unit (mobile unit) location determination that separately processes single time samples of the first fingerprints (i.e., measured fingerprints) will herein be referred to as "static location," which has been shown to be an inherently inaccurate solution. Using a processing approach based on the time series nature of the measured fingerprints, herein referred to as "dynamic location," can yield significant improvements in location accuracy with respect to static location techniques. In this embodiment of the invention, a dynamic location technique, which is based on Markov theory and exploits the time history of the measured fingerprints, is described in FIGS. 6 and 7. The procedure uses a predicted fingerprint model and a time series of fingerprint measurements from the mobile unit to calculate the probability distribution of the mobile unit's location. The probability distribution is then used to compute an estimate of the current location of the mobile unit using one of several statistical methods.

Figure 6:
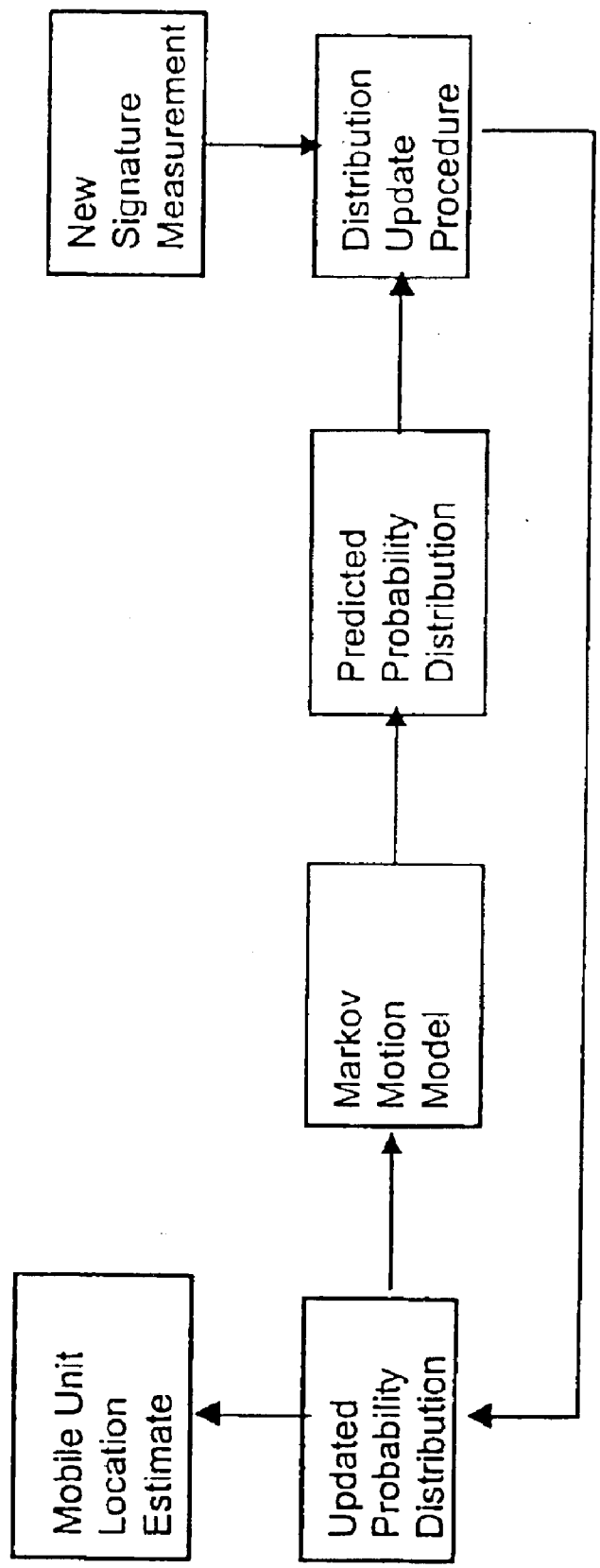
FIG. 6 is a block diagram showing the operation of the recursive processing Markov algorithm.
Figure 7:
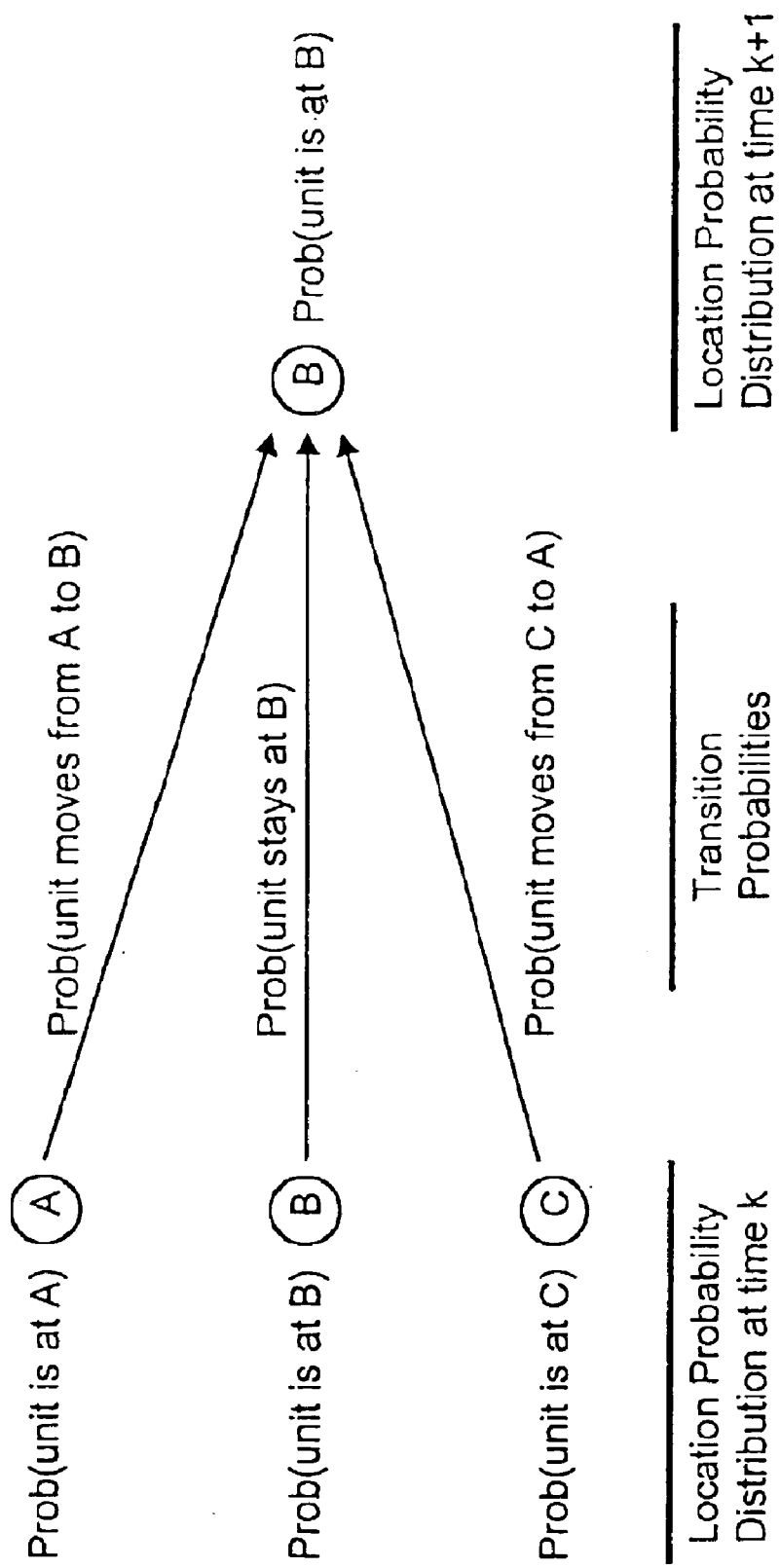
FIG. 7 describes the Markov transition probabilities.

As shown in FIG. 6, the processing algorithm is recursive and uses a predefined array of possible locations. When the algorithm has processed the time series of fingerprint measurements currently available, it will have calculated the probability that the mobile unit is at each point in the array of possible locations (the updated probability distribution). This probability distribution is the basic state of the algorithm that incorporates all of the information that has been collected on the mobile unit up to the current time. When a new fingerprint measurement becomes available, the algorithm uses its knowledge of the possible motions of the mobile unit during the time period between the last measurement and the new measurement to predict a new location probability distribution (the predicted distribution). This prediction algorithm is based on a Markov process model, which uses the probability that the unit is at each location and the probability that it will transition from one location to another to calculate the probability that it will be at each location at the next measurement time (see FIG. 7). Next, the algorithm uses the predicted signature model and the new signature measurement to calculate a location probability distribution based on the new measurement alone. This probability distribution is then combined with the predicted distribution to produce a new updated distribution that now incorporates the information provided by the new measurement.

Before any measurements are available, the algorithm starts with an initial probability distribution that assumes that the mobile unit is equally likely to be at any location in the cell for the base station handling the call. The location probability distribution (either updated or predicted) may be used to compute an estimate of the mobile unit's location whenever such an estimate is needed. The basic algorithm calculates both the expected location and the most probable location, but other location statistics (as deemed appropriate) could also be calculated from the location probability distribution. The location estimate may be calculated for either the time of the last fingerprint measurement (which yields a filtered estimate) or for some time before the last fingerprint measurement (which yields a smoothed estimate). The smoothed estimate is more accurate than the filtered estimate, because it uses more information (i.e., some number of subsequent measurements). However, the smoothed estimate requires both a larger state and more computation than the filtered estimate.

Matching the measured fingerprints to the fingerprint database may yield multiple location possibilities in the presence of measurement and modeling errors. A single hypothesis approach that selects the best location estimate for the mobile unit using only the current measured fingerprint is likely to produce erroneous results. In this embodiment, a multiple hypothesis testing technique uses measured fingerprints from multiple times, the fingerprint database, and mobile unit motion constraints to generate multiple hypotheses for mobile unit locations over time and then selects the best hypothesis based upon statistical measures.

Figure 8:
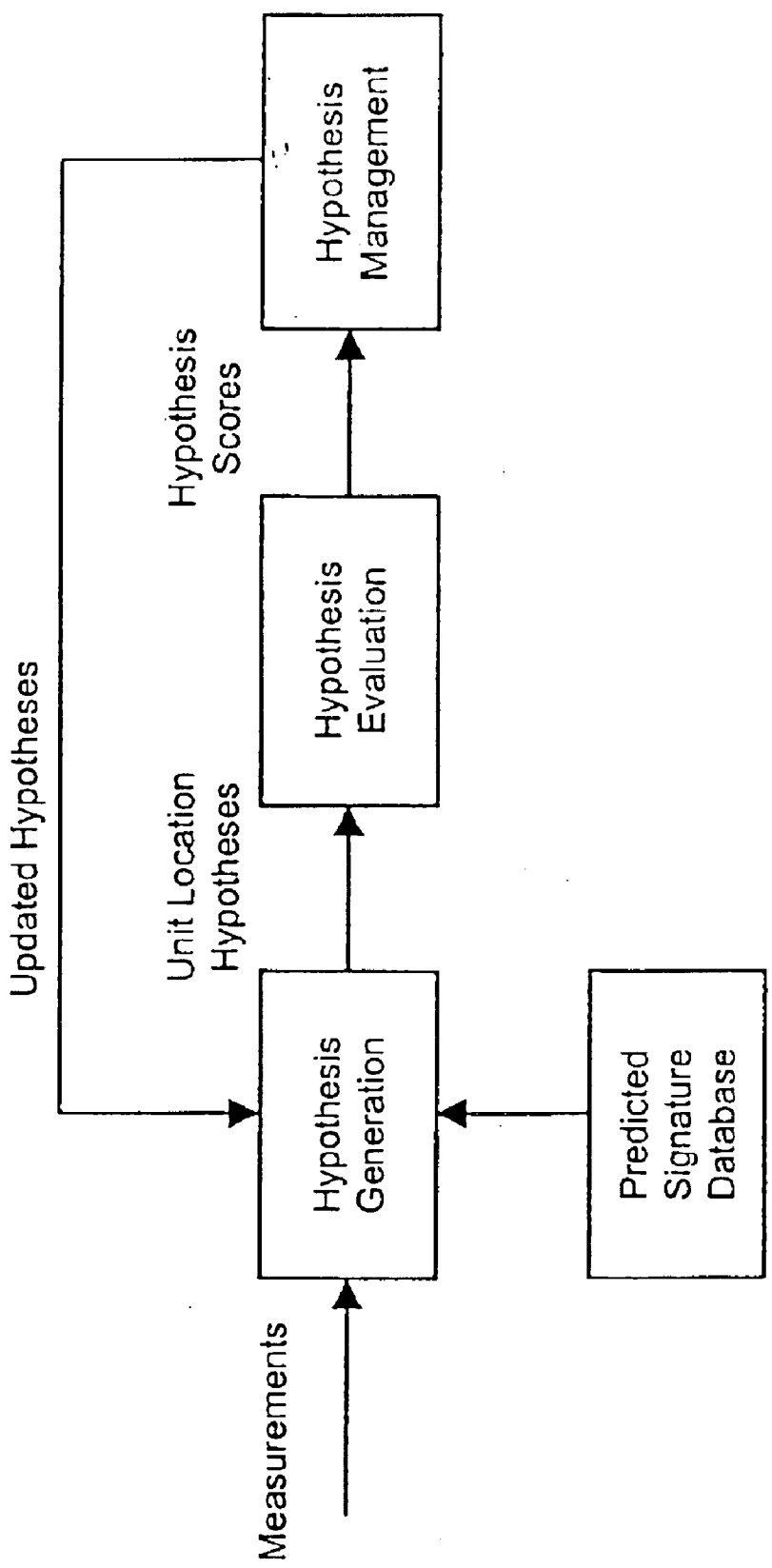
FIG. 8 is a block diagram showing the operation of the multiple hypothesis testing algorithm.

In FIG. 8, the measured fingerprints are compared with the fingerprint database to generate possible mobile unit location hypotheses. When previous location hypotheses are available, these hypotheses are updated with the latest measurements to form new hypotheses. The number of hypotheses is reduced by considering only those locations that are consistent with the previous location hypotheses. A previous location hypothesis may yield multiple new hypotheses because of possible new locations. However, some previous location hypotheses may not have consistent new locations based on the new measurements. A hypothesis evaluation algorithm then assigns a score to each of the updated location hypotheses. This score measures how well the locations at different times in the hypothesis are consistent with reasonable mobile unit motion and measurements characteristics. The evaluation of this score is based upon statistical techniques and uses mobile unit motion constraints, the fingerprint database, and the measured fingerprint characteristics. The score also depends on the score of the previous hypothesis. The location hypotheses are then ranked according to this score. A hypothesis management algorithm reduces the number of hypotheses by removing hypotheses with low scores and combining similar hypotheses. The surviving hypotheses are then updated with new measurements.

If the search takes too long to complete, the resulting answer will be stale and ordinarily of little value. Therefore, the illustrative embodiment seeks to shorten the time that the search takes to complete.

The length of time that the search takes to complete is related to its computational complexity. Furthermore, the computational complexity of the search is related to the number of fingerprints that must be considered, and the number of fingerprints that must be considered is related to the number of possible locations where the mobile unit could be. Therefore, the length of time that the search takes to complete is related to the number of possible locations of the mobile unit that must be considered.

As the number of possible locations to search increases, the length of time to complete the search also increases. Analogously, as the number of possible locations to search decreases, the length of time to complete the search also decreases. Therefore, the illustrative embodiment seeks to reduce the length of time it takes to complete the search by reducing the number of possible locations that must be searched.

The number of possible locations of the mobile unit that must be searched can be reduced when an approximate estimate of the mobile unit's location is available. For example, an approximate estimate of the mobile unit's location can be determined from the identity of the cell site serving the mobile unit. This can, for example, reduce the number of possible locations by a factor of one thousand or more.

Similarly, the number of possible locations that must be searched can be reduced by knowing which signals the mobile unit has reported it is able to receive and distinguish. This concept is described in detail below and with regard to FIGS. 11 through 19.

Figure 11:
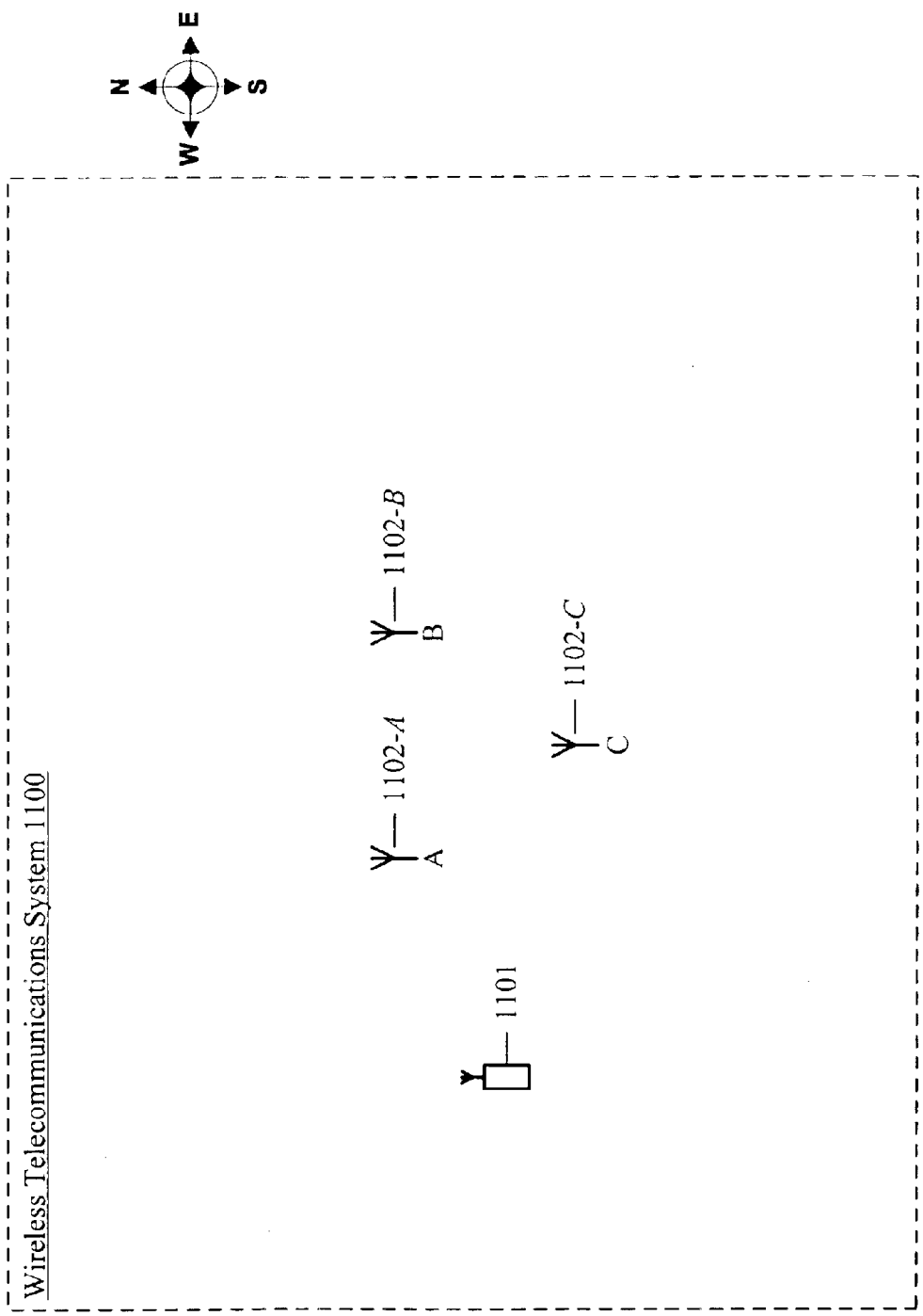
FIG. 11 depicts a map of a geographic region that is serviced by a typical wireless telecommunications system.

FIG. 11 depicts a map of a geographic region that is serviced by a wireless telecommunications system. In this wireless telecommunications system, there are three omni-directional cell sites, Cell Site A, Cell Site B, and Cell Site C, that are responsible for providing service to the mobile units (e.g., mobile unit 1101) within the purview of the system.

Figure 12:
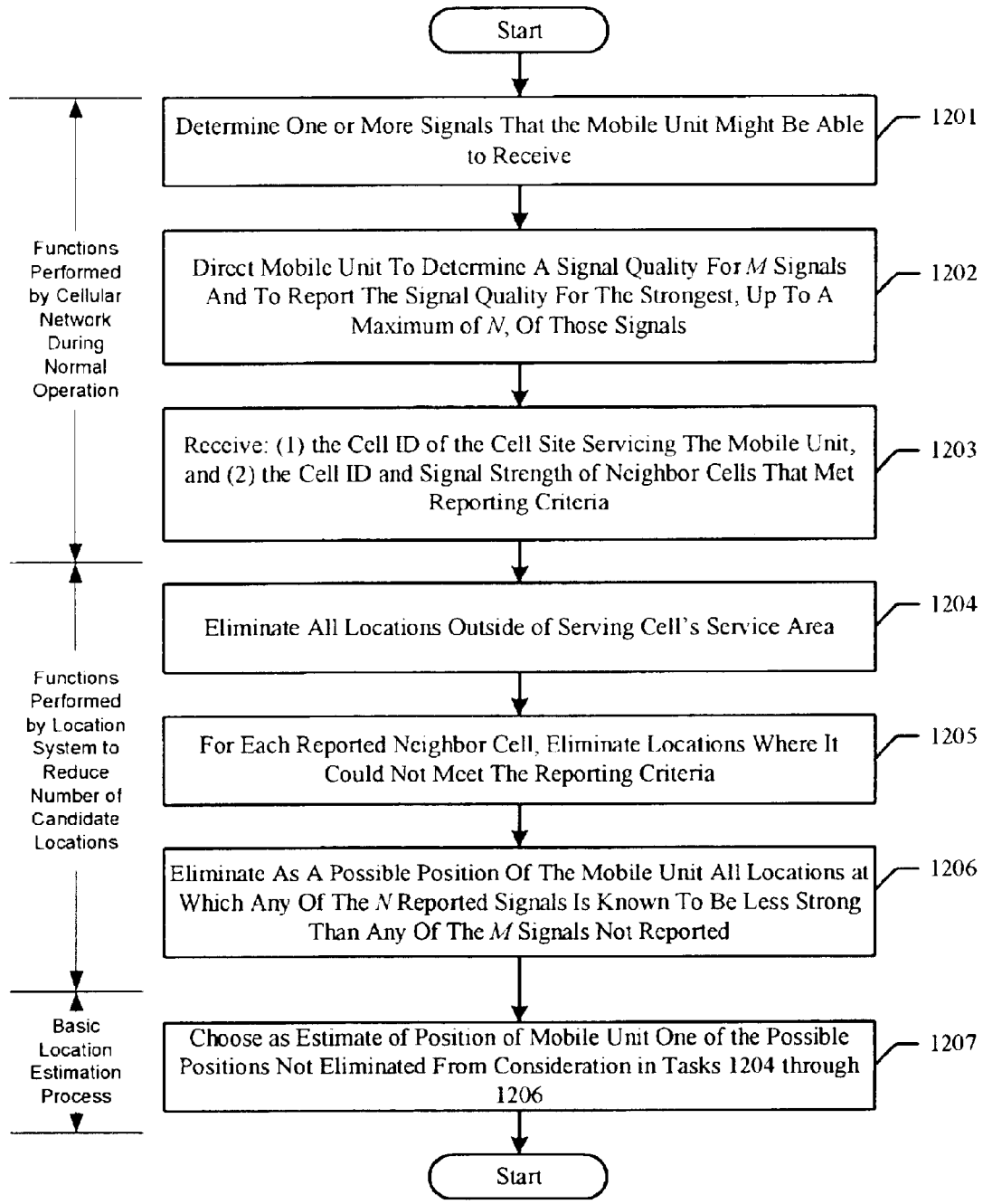
FIG. 12 depicts a flowchart of a technique in accordance with the illustrative embodiment.

At any given moment, each mobile unit is at one of a number of locations, and the flowchart depicted in FIG. 12 describes a method for estimating the location of the mobile unit so that the number of fingerprints to be searched can be reduced.

Initially, the location server maintains a database that lists all of the possible locations for the mobile unit. Table 1 depicts a portion of such an illustrative database. The database correlates to each location:

i. the fingerprint associated with that location,
   ii. the identities of the cell sites that could serve that location,
   iii. the identities of the cell sites that could be received as neighbors at that location.

How this information is used will be described in detail below. For example, the fingerprint is the signal, so it doesn't need to be saved again. Furthermore, in the illustrative embodiment the absolute signal strength is saved and not the relative signal strength because the calculation of relative signal strength must be done in real-time because it depends on which signals are reported (i.e., signal strength of one signal relative to another reported signal) and there are too many possible combinations of reported and unre ported signals. It will be clear to those skilled in the art how to compile and maintain such a database.

TABLE 1

Database of Possible Locations of Mobile Unit

| Location | Latitude | Longitude | Fingerprint | Possible Serving Cell Site(s) | Possible Neighbor Cell Site(s) |
|---|---|---|---|---|---|
| 1 | 47° 10' 23.12" N. | 127° 23' 41.73" W. | $F_1$ | A, B | B, A |
| ... | ... | ... | ... | ... | ... |
| 60,000 | 47° 13' 46.33" N. | 127° 26' 44.53" W. | $F_{60,000}$ | C | A, C |

In accordance with the illustrative example, and as shown in Table 1, the mobile unit is at one of sixty thousand (60,000) possible locations. It will be clear to those skilled in the art, however, after reading this specification, that other systems might comprise a different number of locations. Although the location server could compare the RF fingerprints received from the mobile unit to all 60,000 possible locations, the method depicted in FIG. 12 eliminates some of the 60,000 possible locations based on which signals the mobile unit is able to receive and the relative strength of those signals in every location.

FIG. 12 depicts a flowchart of the tasks associated with reducing the number of possible locations that must be searched in accordance with the illustrative embodiment. Tasks 1201 though 1203 are normally performed by the cellular network as a part of its operation. Task 1207 is the operation of the base location server described in this specification. Tasks 1204 through 1206 are elements of the present invention, and their purpose is to reduce the number of possible positions that must be considered by task 1207.

At task 1201, the cellular network determines one or more signals that the mobile unit might or might not be able to receive. To accomplish this, the cellular network comprises a database that lists which signals might be receivable by the mobile unit.

In accordance with the illustrative embodiment, each receivable signal is a base station control channel, which can be distinguished based on a Base Station Identity Code. It will be clear to those skilled in the art how to make and use embodiments of the present invention that are keyed to a different signal.

At task 1202, the cellular network directs the mobile unit to attempt to receive the signals in Table 2 and to and report back a signal strength value for the strongest (up to) M signals that the mobile unit is able to receive and distinguish, wherein M is a positive integer. For example, when M=3 and the mobile unit is able to receive and distinguish 4 signals, the mobile only reports back the signal strength for the 3 strongest. On the other hand, when M=3 and the mobile unit is able to receive and distinguish 2 signals, the mobile only reports back the signal strength for the 2 signals.

In accordance with the illustrative embodiment, consider the situation where Cell A is the serving cell (i.e., the cell currently handling the communications traffic to and from the mobile) and the cellular system directs the mobile to monitor signals on control frequencies of Cell B and Cell C and to report the strongest of these two neighbors that it can distinguish. Note that the mobile can obviously distinguish the signal from Cell A; otherwise Cell A could not be acting as the serving cell.

At task 1203, the cellular network receives the signal strength report from the mobile unit in response to the direction in task 1202. With this information and the data in Table 1, the location server uses three logical tests to reduce the number of possible locations whose fingerprints must be considered. The three tests are:

Test #1—Eliminate all locations outside the serving area of the cell that is reported as the serving cell.

Test #2—Eliminate all locations outside the neighbor area of the cells that are reported as neighbor cells.

Test #3—Eliminate all locations at which an unreported neighbor is known to be stronger than a reported neighbor.

In accordance with the illustrative embodiment, the location server receives a report on 2 signals, Signal A=−11 dBm, which is identified as being associated with the serving cell, and Signal B=−14 dBm.

Figure 13:
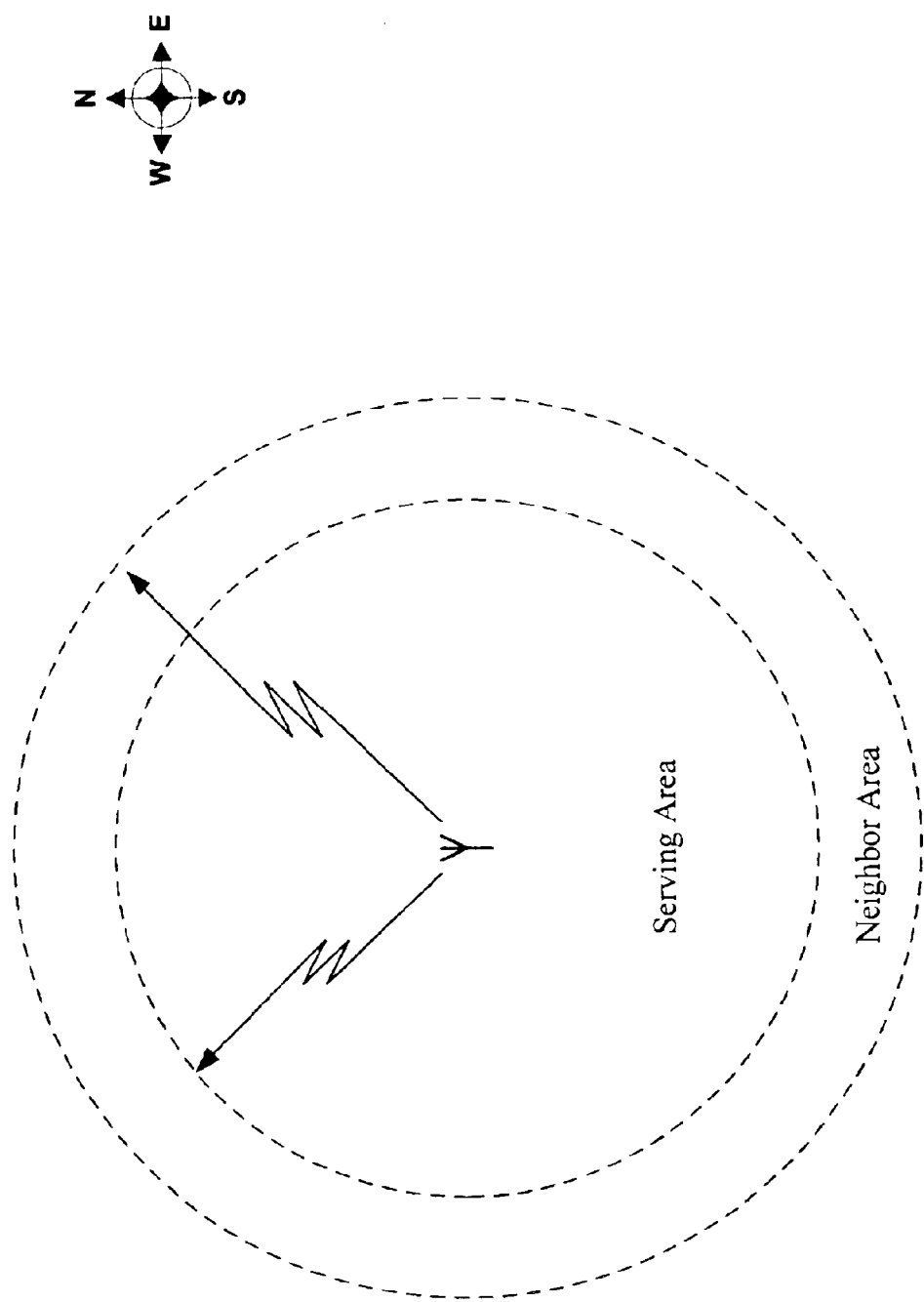
FIG. 13 depicts a map of the serving area and the neighbor area associated with a cell site.

As shown in FIG. 13, there is an area called the "serving area" around each cell site where that cell site could serve a mobile unit. Furthermore, there is a larger area called the "neighbor area" around each cell site where that cell site could be recognized by a mobile unit as a neighbor. In the illustrative embodiment, both the serving area and the neighbor areas are depicted as circles with the cell site at their center. It will be clear to those skilled in the art how to make and use embodiments of the present invention in which the serving areas and neighbor areas have different shapes and sizes.

Figure 14:
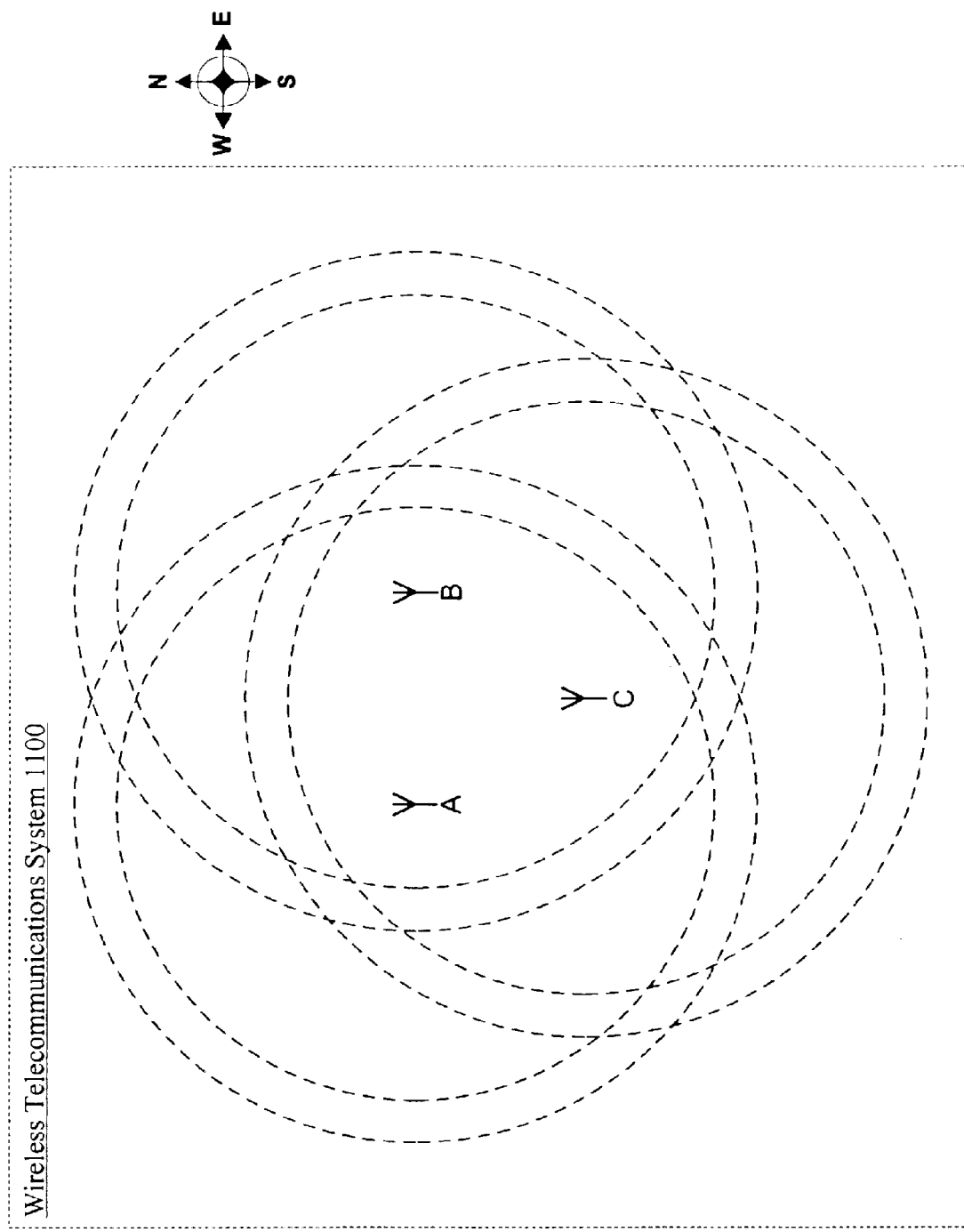
FIG. 14 depicts a map of the serving areas and the neighbor areas associated with Cell Site A, Cell Site B, and Cell Site C.
Figure 15:
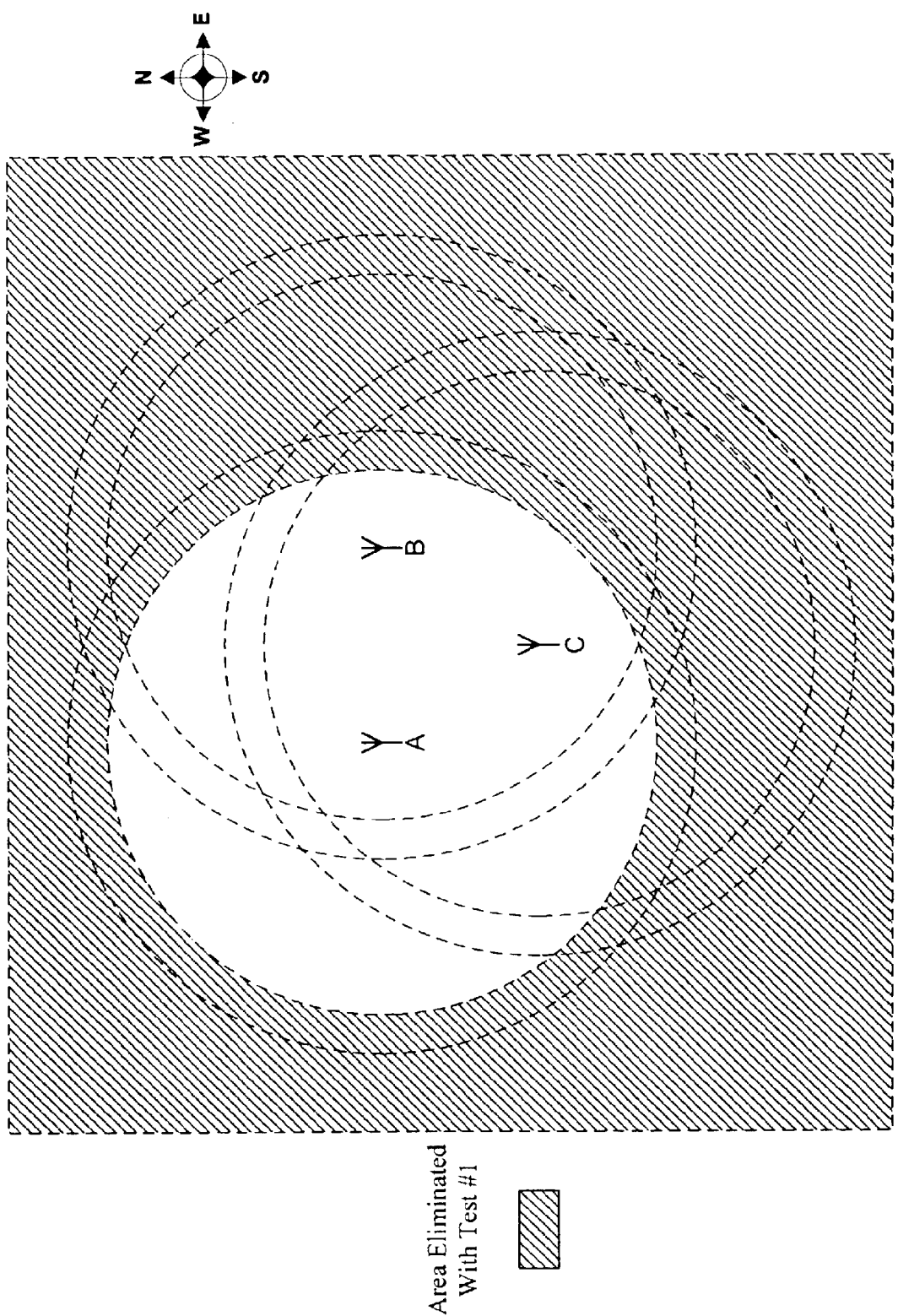
FIG. 15 depicts a map of the locations that can be eliminated because they are outside the serving cell's serving area.
Figure 16:
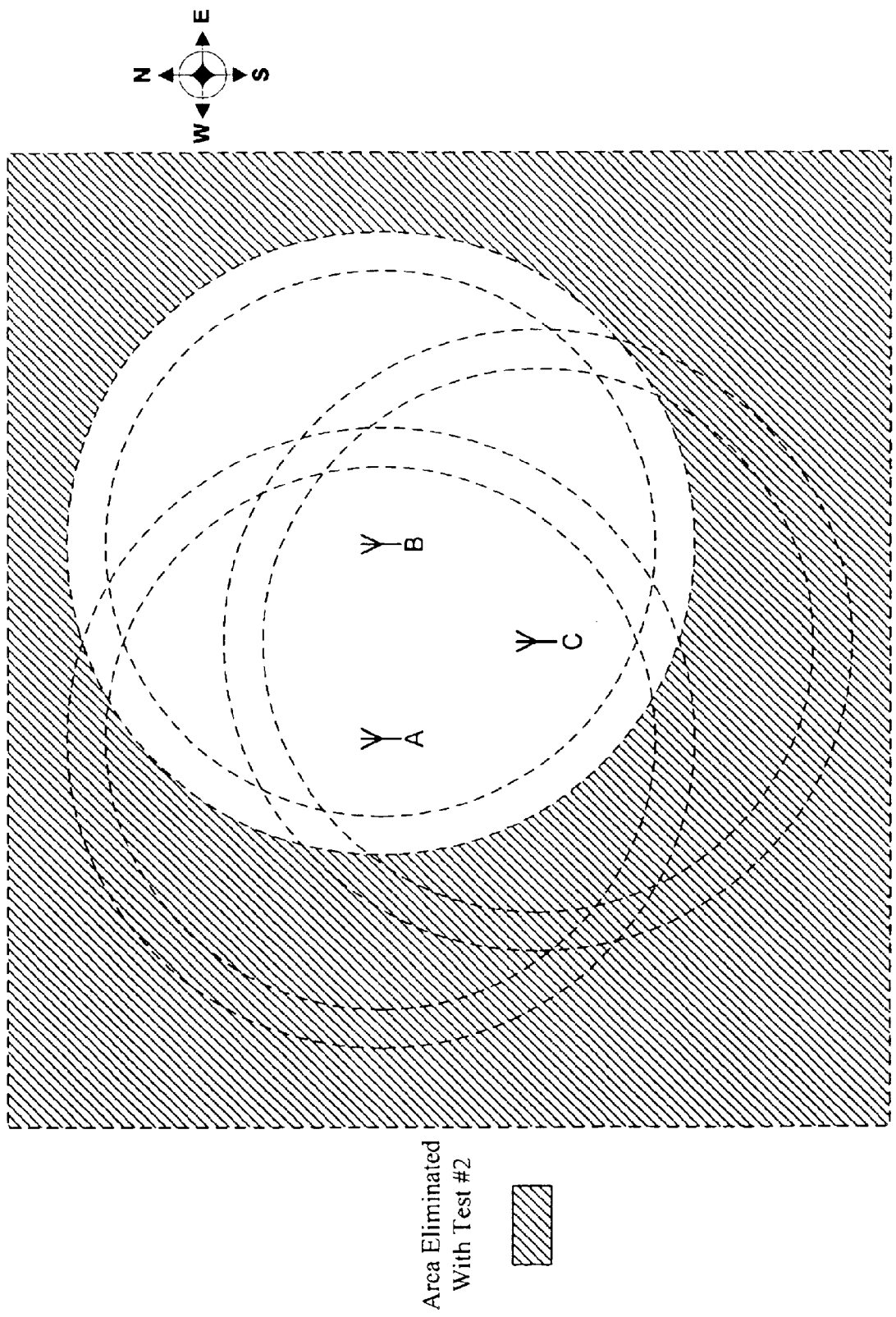
FIG. 16 depicts a map of the locations that can be eliminated because they are outside the reported neighbor cell's neighbor area.

FIG. 14 depicts a map of wireless telecommunications system 1100, and the respective serving and neighbor areas for each of the three cell sites. From FIG. 14, it should be noted that some locations can be serviced by all three cell sites, some by only two cell sites, and some by only one cell site. Furthermore, some locations are neighbors for none, one, or two cell sites.

At task 1204, in accordance with Test #1, the location server eliminates from consideration all locations outside of the serving cell's serving area.

Because Cell A is the serving cell, the location server eliminates from consideration all locations outside of Cell Site A's serving area. This is depicted graphically in FIG. 15, and can be computed from the list of possible serving sites in Table 1.

At task 1205, in accordance with Test #2, the location server eliminates from consideration all locations outside of the reported neighbor cell's neighbor area.

In the illustrative embodiment, Signal B, which is associated with Cell Site B, was reported as a neighbor signal at task 1203. Therefore, as graphically depicted in FIG. 16, all locations outside of the neighbor area for Cell Site B are eliminated from consideration. This can be computed from the list of possible neighbor sites in Table 1.

At task 1206, in accordance with Test #3, the location server eliminates from consideration all locations that would have been reported in task 1203 had the mobile unit been, in fact, at that location. For example, in the illustrative embodiment the mobile unit was directed to report the stronger or two signals from neighbors B and C and the mobile unit reported Signal B. Therefore, the location server can logically eliminate from consideration all locations where Signal C is known to be stronger than Signal B. This can be computed from the fourth column of Table 1.

Figure 17:
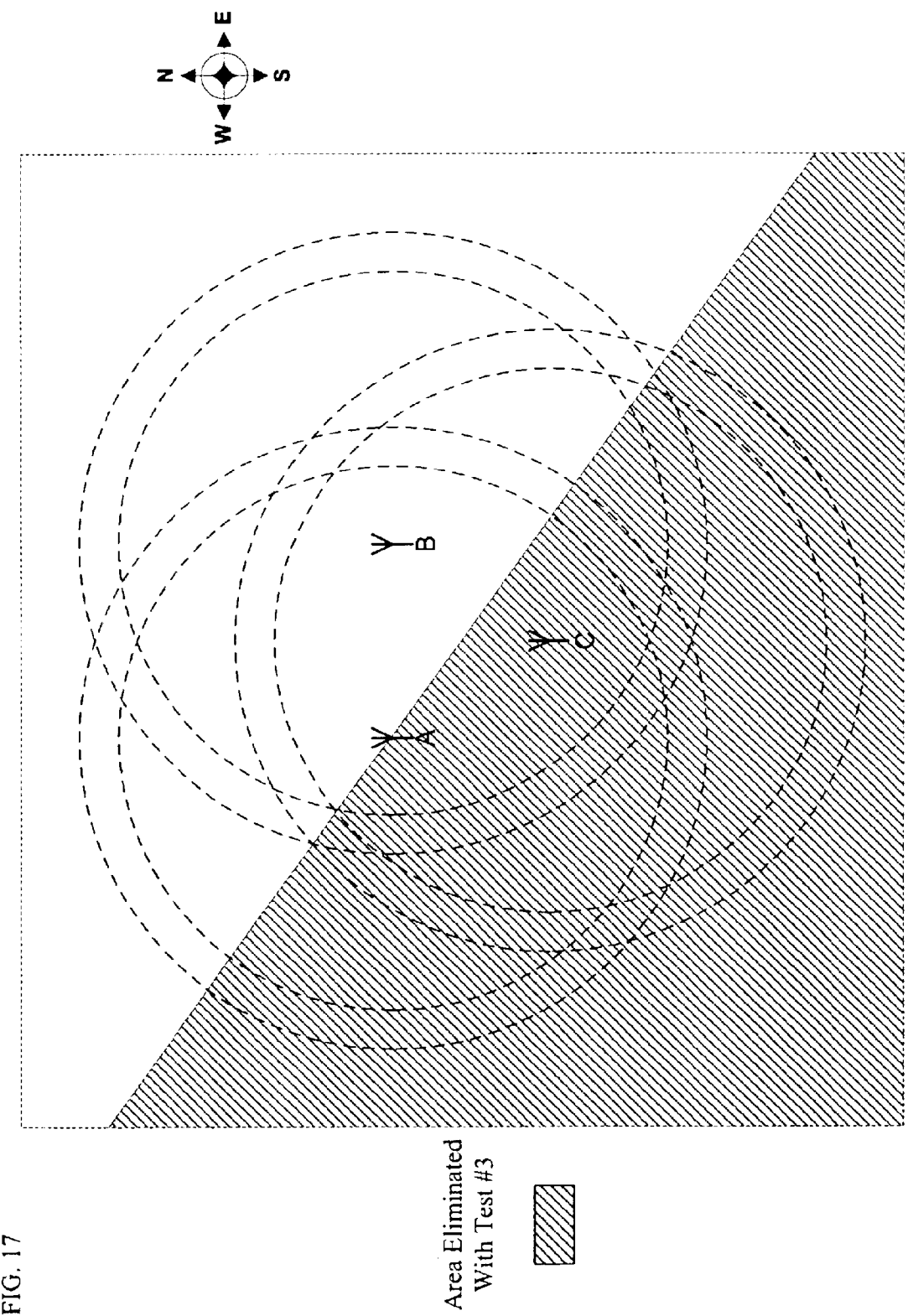
FIG. 17 depicts a map of the locations that can be eliminated because an unreported signal is known to be stronger than one of the reported signals.

Because neighbor Signal B was reported in task 1203 and neighbor Signal C was not, FIG. 17 depicts a map of the locations that can be eliminated because Signal C is stronger than Signal A at those locations.

In summary, FIG. 18 depicts a map of the locations that can be eliminated through Test #1, #2, or #3, and, therefore, it also depicts the locations whose fingerprints must be searched.

Figure 19:
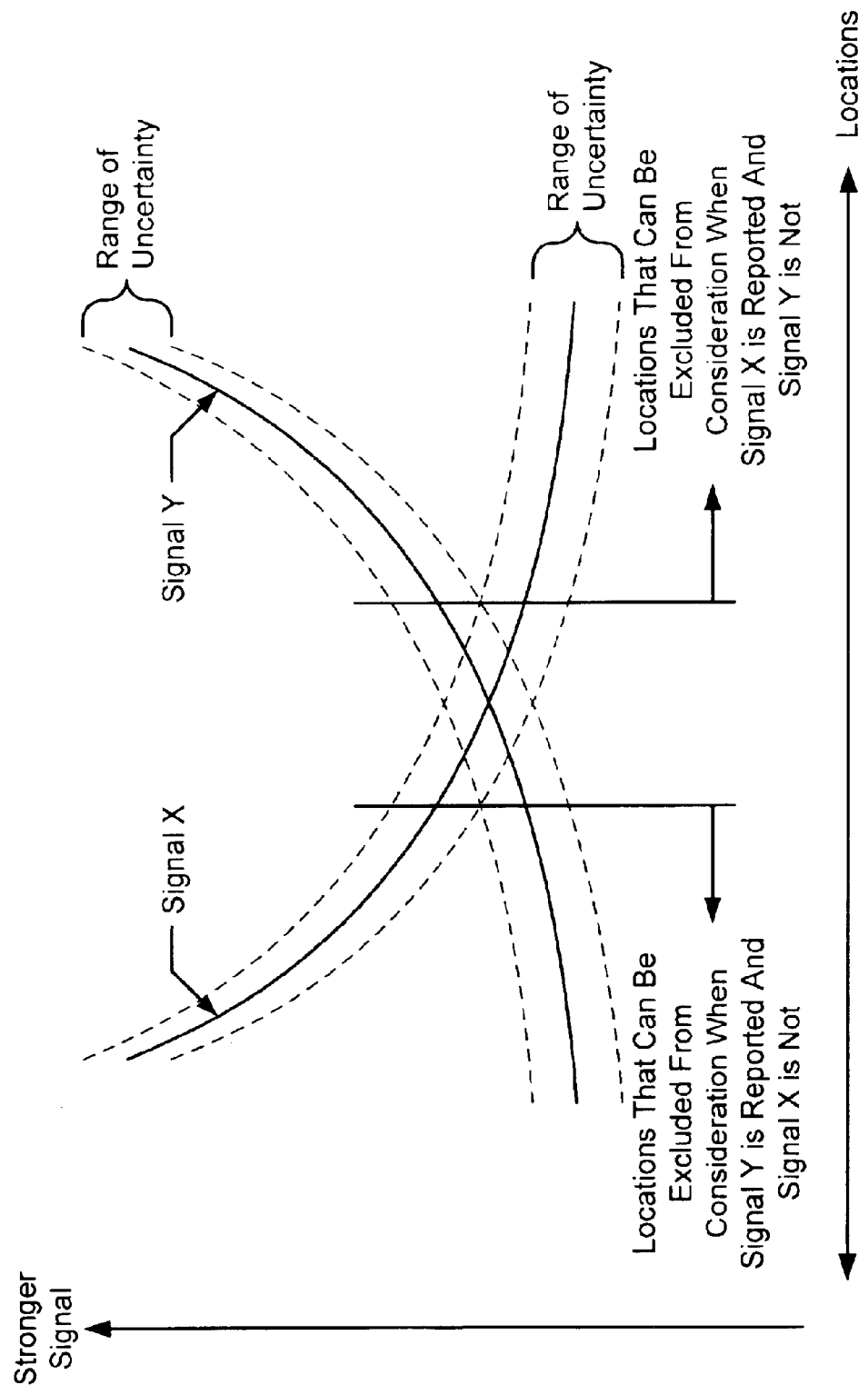
FIG. 19 depicts a graph that illustrates the logic that underlies how the illustrative embodiment eliminates some locations from consideration given the relative signal strength of two signals.

Because there is a range of uncertainty in the measurement of all signals, the boundary of which locations can—and which cannot—must consider that range of uncertainty. FIG. 19 depicts a graph that illustrates the logic that underlies which locations can be eliminated based on the range of uncertainty in the measurement of the signals. Taking this effect into account, the dividing line in FIG. 17 is technically closer to cell site C than it is to cell site B, rather than equidistant between the two.

At task 1207, the location server chooses as an estimate of the location of the mobile unit one of the possible locations not eliminated from consideration in tasks 1204, 1205, or 1206, and as depicted in FIG. 18. Furthermore, the search complexity is reduced by noting the time at which the location information is requested.

FIG. 9 illustrates a structure 400 of the fingerprint in one embodiment. As mentioned previously there are several possible methods for defining the fingerprint; FIG. 9 is but an example. The time at which the fingerprint is captured is stored in the fingerprint structure, as shown by box 401. In one embodiment the UTC format is used to store time. There are several fields in the structure, some of which are optionally filled by the mobile unit. Some other fields are optionally filled by the location server. It is not necessary that all fields be filled, since the necessary fields can be predetermined based on system parameters.

The fingerprint comprises characteristics of received signals at multiple frequencies. Each column in FIG. 9 is information pertaining to a particular frequency or carrier. A Station ID field 403 indicates the unique identifying code of a broadcasting station from which the signal emanated. This field is optional. In one embodiment this field is filled by the mobile unit using information received in the signal. In another embodiment this field is filled by the location server to indicate to the mobile unit as to which signals to capture for the fingerprint. A Frequency field 405 is the unique frequency value at which a signal is captured. Either the Station ID field or the Frequency field is mandatory since without both it is not possible to identify the signal. A Tuning Parameter field 407 is used when the mobile unit requires additional information to tune to a particular carrier. In one embodiment this field is supplied by the location server with information containing the modulation characteristics of the signal. This field is optional. In one embodiment a Transmitter Location field 409 is used to characterize the received signals. In another embodiment this field is filled by the location server. The mobile unit may optionally use this information to determine if it wants to capture the signal emanating from a particular transmitter. Finally, Signal Strength fields 411, 413, are filled by the mobile unit based on the signal strengths of the received carriers. In one embodiment the signal strength is sampled multiple times for each frequency in order to smooth out any variations. At least one of the Signal Strength fields is required to be filled by the mobile unit.

FIG. 10 shows the high level structure of the fingerprint database 501 in one embodiment. As one skilled in the art can appreciate, there are many methods for building, managing and searching databases. The purpose of FIG. 10 is merely to illustrate the structure of the database in one embodiment. Each row in database 501 corresponds to one fingerprint. The Lat and Long fields indicate the latitude and longitude of the location to which the fingerprint corresponds. In one instance the fingerprint corresponds not to one exact spot on the surface of the earth, but instead to a small area. The Lat and Long fields in this embodiment indicate a position inside the area, preferably the center point. The Time column indicates the time at which the fingerprint was captured. In one embodiment the UTC time format is used to indicate this time. The Fingerprint column contains the actual fingerprint data. In one embodiment the structure depicted in FIG. 9 is used to store the fingerprint data. Finally, the Description column contains a short description of the location corresponding to the fingerprint. For example, it may indicate a street address, or an intersection. This field is optional.

In one embodiment, the database is built by taking off-line snapshots of fingerprints at various locations. The fingerprint information along with the coordinates of the location are entered into the database. The more the locations, the richer the database. The resolution of location determination is also controlled by how far apart the fingerprint samples are taken. The closer they are, the higher the resolution. Of course, a person skilled in the art can appreciate that the resolution of the database is limited by the sensitivity of the fingerprint measuring device. In one embodiment the fingerprints are taken using very sensitive signal measuring devices that enable locations that are very close to each other to have distinct fingerprints.

In another embodiment, the database is built by taking fingerprint measurements at predetermined locations and using intelligent algorithms that interpolate the fingerprints at all locations in between the sampled locations. This method has the advantage of not requiring a great many physical measurements to be made, however, it does suffer from some loss in accuracy. This is because, however clever, the interpolating algorithms will not be as accurate as making the actual measurements.

In yet another embodiment, the database is generated on-line using smart algorithms that can predict the fingerprints in a local area. This scheme is effective in instances where an approximate idea of the mobile unit location is already available. For example, this could be the cell in which the mobile unit is located.

Location estimation procedures using a predicted fingerprint model and fingerprint measurements from the mobile unit are subject to several sources of error, including errors in measuring the fingerprints and mismatches between the fingerprint model and the real world. If the predicted fingerprints in two locations are similar, either of these error sources may cause the measured fingerprint to more closely match the fingerprint model for the incorrect location than for the correct location. This situation leads to the possibility of fingerprint ambiguities.

For this embodiment of the invention, when a fingerprint model is produced for a particular region, it can be subjected to statistical analysis to assess both the location accuracy that may be expected in that region and to identify specific areas that can have potential ambiguity problems. For each point in the fingerprint model, the probability distribution of ambiguous locations may be calculated, as a function of the level of errors expected, by computing the likelihood that each pair of location points will be confused at that error level. The characteristics of this distribution provide information about the accuracy and confidence of location estimates. If the distribution at a particular point is tight (low statistical variance), location estimates of mobile unit's at that location should be quite accurate. If the distribution at a particular point is very broad (high statistical variance), location estimates of mobile unit's at that location are likely to be inaccurate. Conversely, if the calculated location estimate is at a point known to have high ambiguity (high statistical variance), the confidence attributed to that estimate should be low.

The following references are incorporated by reference in their entirety for all purposes:

1. T. Suzuki, et al., The Moving-body Position Detection Method; Patent Application (Showa 63–195800), August 1988.
2. M. Hellebrandt, et al., Estimating Position and Velocity of Mobiles in a Cellular Radio Network, IEEE Trans. On Vehicular Technology, Vol. 46, No. 1, pp. 65–71, February 1997.
3. I. Gaspard, et al., Position Assignment in Digital Cellular Mobile Radio Networks (e.g. GSM) Derived from Measurements at the Protocol Interface, IEEE Journal, pp. 592–596, March 1997.
4. J. Jimenez, et al., Mobile Location Using Coverage Information: Theoretical Analysis and Results, COST 259 TD (98), April 1999.

CONCLUSION

In conclusion, it can be seen that this invention has one or more of the following significant improvements over prior art for mobile unit location techniques: (1) it can be implemented without requiring any modifications to the existing wireless network infrastructure, (2) only minor software changes in the mobile unit (typically a cellular phone) are required, and (3) it can be utilized in areas where GPS coverage is either not available or not reliable. This follows because the fingerprints are generated by using portions of the RF spectrum that typically have superior coverage and in-building penetration than GPS signals.

While the above is a complete description of specific embodiments of the invention, various modifications, alternative constructions, and equivalents may be used. Therefore, the above description should not be taken as limiting the scope of the invention as defined by the claims.

What is claimed is:

1. A method for estimating the location of a mobile unit from a plurality of possible positions, said method comprising:
   receiving an indication from said mobile unit that said mobile unit does not receive a first signal from a first transmitter;
   eliminating some of said plurality of possible positions from consideration based on the fact that said mobile unit did not receive said first signal from said first transmitter; and
   choosing as an estimate of said position of said mobile unit one of said plurality of possible positions not eliminated from consideration based on the fact that said mobile unit did not receive said first signal from said first transmitter.

2. The method of claim 1 wherein said indication from said mobile unit that said mobile unit does not receive a first signal from a first transmitter is inferred because said mobile unit failed to indicate that said mobile unit did receive said first signal.

3. The method of claim 1 wherein said indication from said mobile unit that said mobile unit does not receive a first signal from a first transmitter is explicit.

4. The method of claim 1 further comprising:
   receiving an indication from said mobile unit that said mobile unit does not receive a second signal from a second transmitter;
   eliminating some of said plurality of possible positions from consideration based on the fact that said mobile unit did not receive said second signal from said second transmitter; and
   choosing as an estimate of said position of said mobile unit one of said plurality of possible positions not eliminated from consideration based on the fact that said mobile unit did not receive said first signal from said first transmitter or said second signal from said second transmitter.

5. The method of claim 1 further comprising:
   receiving an indication from said mobile unit that said mobile unit did receive a second signal from a second transmitter;
   eliminating some of said plurality of possible positions from consideration based on the fact that said mobile unit did receive said second signal from said second transmitter; and
   choosing as an estimate of said position of said mobile unit one of said plurality of possible positions not eliminated from consideration based on the fact that said mobile unit did not receive said first signal from said first transmitter but did receive said second signal from said second transmitter.

6. A method for estimating the location of a mobile unit, said method comprising:
   receiving the cell ID of the cell site servicing said mobile unit;
   generating a plurality of possible positions in which said mobile unit might be based on said cell ID;
   receiving an indication from said mobile unit that said mobile unit did not receive a first signal from a first transmitter;
   eliminating some of said plurality of possible positions from consideration based on the fact that said mobile unit did not receive said first signal from said first transmitter; and
   choosing as an estimate of said position of said mobile unit one of said plurality of possible positions not eliminated from consideration based on the fact that said mobile unit did not receive said first signal from said first transmitter.

7. The method of claim 6 wherein said indication from said mobile unit that said mobile unit does not receive a first signal from a first transmitter is inferred because said mobile unit failed to indicate that said mobile unit did receive said first signal.

8. The method of claim 6 wherein said indication from said mobile unit that said mobile unit does not receive a first signal from a first transmitter is explicit.

9. The method of claim 4 further comprising:
   receiving an indication from said mobile unit that said mobile unit does not receive a second signal from a second transmitter;
   eliminating some of said plurality of possible positions from consideration based on the fact that said mobile unit did not receive said second signal from said second transmitter; and
   choosing as an estimate of said position of said mobile unit one of said plurality of possible positions not eliminated from consideration based on the fact that said mobile unit did not receive said first signal from said first transmitter or said second signal from said second transmitter.

10. The method of claim 4 further comprising:
    receiving an indication from said mobile unit that said mobile unit did receive a second signal from a second transmitter;
    eliminating some of said plurality of possible positions from consideration based on the fact that said mobile unit did receive said second signal from said second transmitter; and choosing as an estimate of said position of said mobile unit one of said plurality of possible positions not eliminated from consideration based on the fact that said mobile unit did not receive said first signal from said first transmitter but did receive said second signal from said second transmitter.

11. A method comprising:

receiving an indication from a mobile unit of a plurality of signals that said mobile unit can receive and a plurality of signals that said mobile unit cannot receive;

generating a plurality of possible positions based on said plurality of signals that said mobile unit can receive and on said plurality of signals that said mobile unit cannot receive; and choosing as an estimate of said position of said mobile unit one of said plurality of possible positions by comparing the fingerprint associated with each of said plurality of possible positions against a fingerprint received from said mobile unit.

12. The method of claim 11 wherein said indication from said mobile unit that said mobile unit does not receive a first signal from a first transmitter is inferred because said mobile unit failed to indicate that said mobile unit did receive said first signal.

13. The method of claim 11 wherein said indication from said mobile unit that said mobile unit does not receive a first signal from a first transmitter is explicit.

14. A method for estimating a location of a mobile unit, said method comprising:

directing said mobile unit to report a signal strength value for the strongest of a first plurality of signals;

receiving a signal strength value from said mobile unit for a second plurality of signals, wherein said second plurality of signals is a non-empty subset of said first plurality of signals; and eliminating from consideration as said location of said mobile unit any location at which any of said second plurality of signals is known to be less strong than any of said first plurality of signals not reported.

15. The method of claim 14 wherein a range of uncertainty is considered when determining when any of said second plurality of signals is compared with any of said first plurality of signals.

* * * * *